United States Patent [19] [11] 4,231,983
French [45] Nov. 4, 1980

[54] PLASTIC PIPE JOINT AND METHOD AND ASSEMBLY FOR MAKING SAME

[75] Inventor: David W. French, Littleton, Colo.

[73] Assignee: Johns-Manville Corporation, Denver, Colo.

[21] Appl. No.: 7,267

[22] Filed: Jan. 29, 1979

Related U.S. Application Data

[62] Division of Ser. No. 826,586, Aug. 22, 1977, Pat. No. 4,170,448.

[51] Int. Cl.² .............................................. B29D 23/00
[52] U.S. Cl. .................................... 264/249; 264/296; 264/322
[58] Field of Search ...... 425/393, 438, 392, DIG. 218; 264/294, 249, 296, 322; 72/370

[56] References Cited
U.S. PATENT DOCUMENTS

| 3,432,887 | 3/1969 | Poux et al. | 425/393 |
| 3,749,543 | 7/1973 | Stansbury | 425/DIG. 218 |
| 3,823,216 | 7/1974 | Petzetakis | 425/393 |
| 3,836,622 | 9/1974 | Sporre | 264/296 |
| 3,849,052 | 11/1974 | Gordon | 425/393 |
| 3,956,817 | 5/1976 | Blumenkranz | 264/249 |
| 3,966,385 | 6/1976 | Spears | 425/393 |
| 4,030,872 | 6/1977 | Parmann | 425/393 |
| 4,059,379 | 11/1977 | Korff et al. | 425/393 |
| 4,065,243 | 12/1977 | Acda et al. | 425/393 |
| 4,150,087 | 4/1979 | de Putter | 264/296 |

Primary Examiner—James H. Derrington
Attorney, Agent, or Firm—Robert M. Krone; Joseph J. Kelly; Gregory W. O'Connor

[57] ABSTRACT

A bell and spigot pipe joint including a bell end having a locked in sealing gasket and a thickened cross-sectional configuration is disclosed herein. A method and an assembly for making the bell end with its thickened cross-sectional configuration and with the sealing gasket locked in place are also disclosed herein.

3 Claims, 6 Drawing Figures

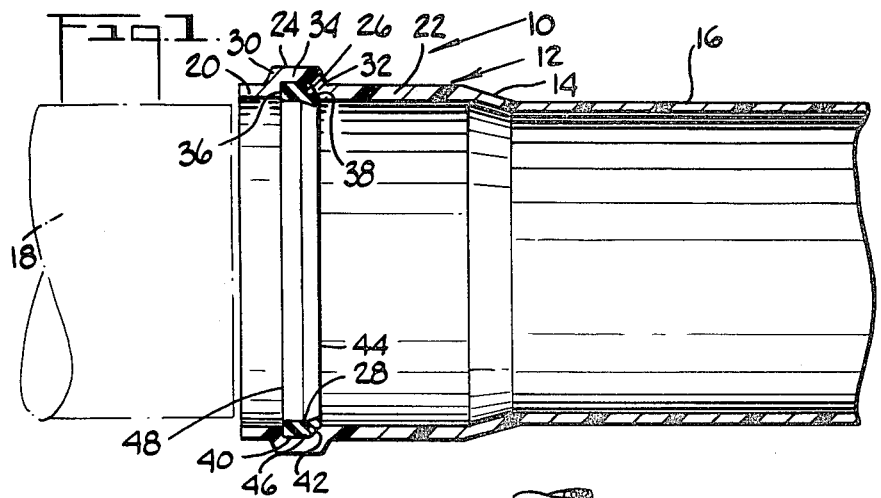
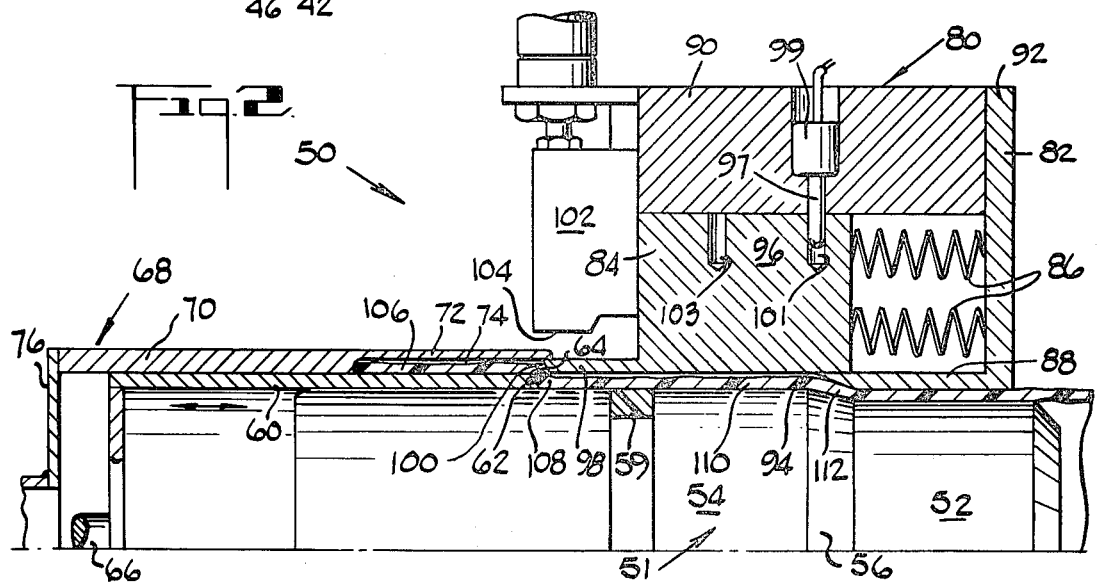
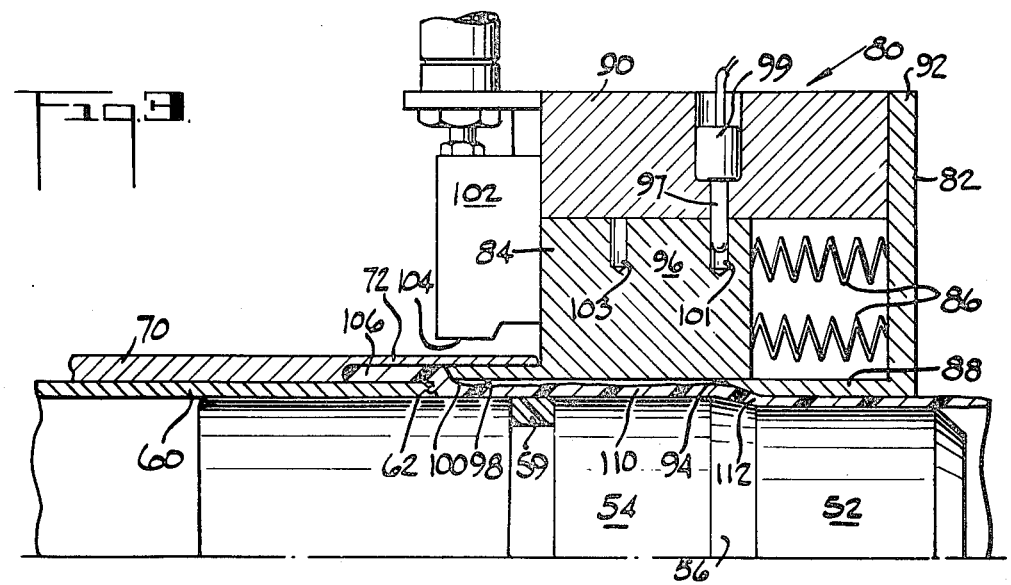

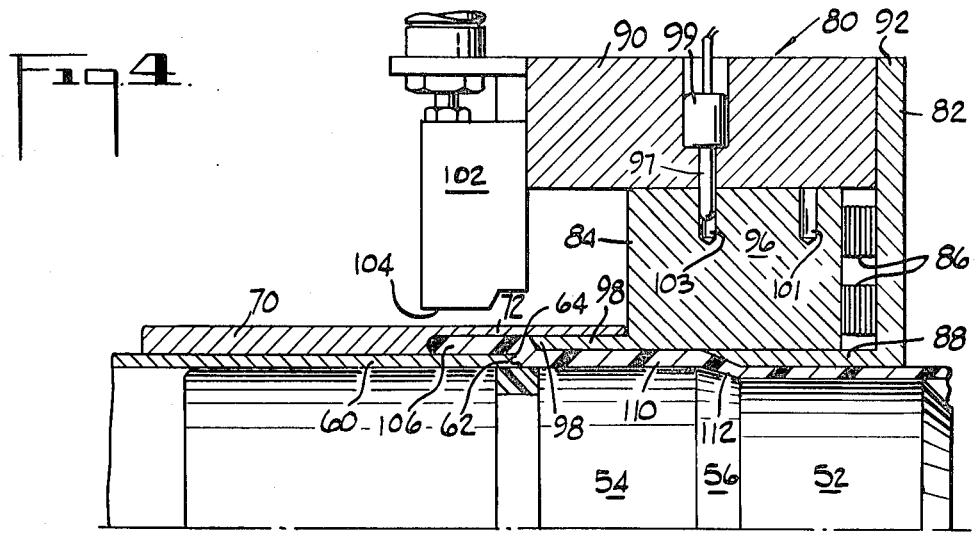
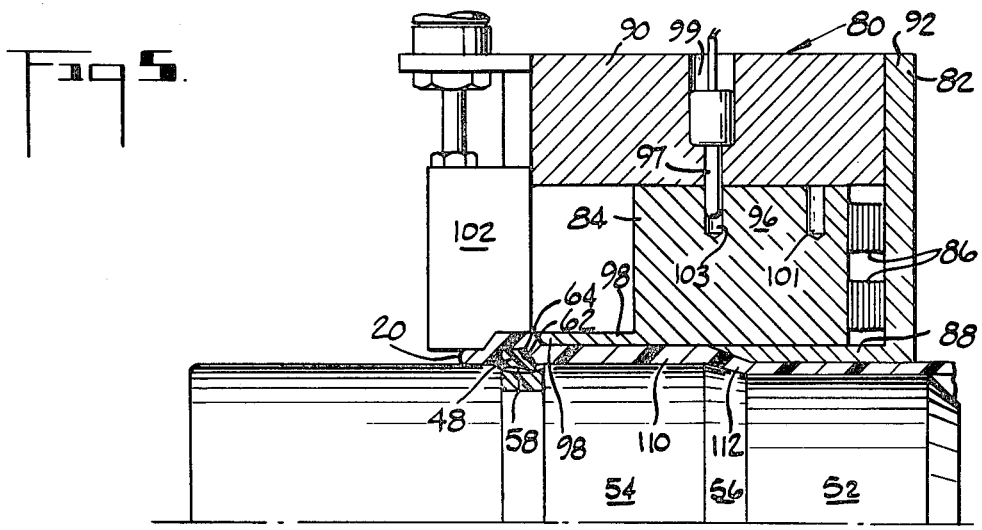
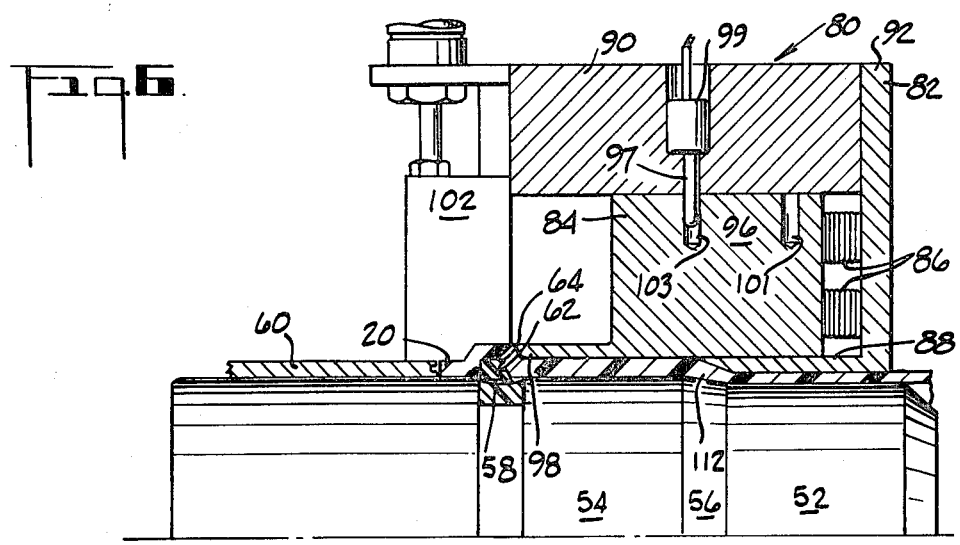

PLASTIC PIPE JOINT AND METHOD AND ASSEMBLY FOR MAKING SAME

This is a division of application Ser. No. 826,586, now U.S. Pat. No. 4,170,448, filed Aug. 22, 1977.

BACKGROUND OF THE INVENTION

The present invention relates generally to plastic pipe joints and more particularly to a method of and assembly for making a specifically designed bell end of a bell and spigot pipe joint.

The utilization of a bell end having a locked in gasket is not new. A bell end of this type is illustrated in U.S. Pat. No. 3,924,999 issued to Allen Harris et al on Dec. 9, 1975. The bell end described in this patent is formed by first heating up one end section of a plastic pipe to its range of thermoelastic deformability. Thereafter, the heated end section is moved onto an enlarged core or mandrel and up and over an annular gasket which has been prepositioned around the mandrel, causing the end section to "thin out." Finally, the circumferential sidewalls of the plastic pipe, on either side of the gasket, are deformed inwardly to lock the gasket in place.

The bell end just described is quite satisfactory for its intended use, especially where the overall joint is to be used for nonpressure service, for example sewer service. In this case, the cross-sectional configuration of the bell end does not have to be post thickened or otherwise thickened to compensate for it being enlarged and thinned out compared to the rest of the pipe. However, where the pipe joint is intended for use in pressure service, for example a water pipe, a number of specifications require that the bell end be thicker in cross-sectional configuration than it would be by belling an unthickened pipe. One way to accomplish this is by thickening the end section of the pipe to be belled before belling takes place. This can be carried out during the actual extrusion of the PVC pipe, as described in U.S. Pat. No. 3,264,383, or it can be accomplished after formation of the pipe, as described in co-pending U.S. application Ser. No. 722,187, filed Sept. 17, 1976 now abandoned. In either case, it has been found to be difficult to lock in the gasket in the manner described in the Harris patent (recited above) where the bell end is pre-thickened or post-thickened as just described.

As will be discussed in more detail hereinafter, the present invention is directed to the manufacture of a bell end and particularly one with a locked in gasket. However, in accordance with the present invention, the bell end is formed, its cross-sectional configuration is thickened, and a circumferential sealing gasket is locked in place therein, all at approximately the same time and utilizing one overall assembly, without pre-thickening or post-thickening the pipe.

SUMMARY OF THE INVENTION

One object of the present invention is to provide an uncomplicated, economical and reliable method of forming a bell end having a thickened cross-sectional configuration and a locked in gasket.

Another object of the present invention is to provide one overall assembly which forms a bell end in one end section of a plastic pipe, which thickens the cross-sectional configuration of the bell end and which locks the circumferential sealing gasket in place within the thickened bell end.

Still another object of the present invention is to provide an assembly of the last-mentioned type which is uncomplicated in design, economical to provide and reliable in use.

In accordance with the present invention, one end section of the plastic pipe is heated to its state of thermal deformability and thereafter formed into a bell end. The assembly utilized to accomplish this includes first means for forming from the heated end section (1) a diametrically enlarged axial end portion and (2) a transverse end wall joining the enlarged portion with the rest of the pipe. The assembly also includes second means for (1) substantially uniformly thickening the cross-sectional configuration of the enlarged end portion by decreasing its length and, at the same time, (2) integrally forming outwardly protruding rib means on the inner surface of the transverse end wall.

As will be described in more detail hereinafter, these ribs are located radially inwardly from the inner surface of the enlarged pipe end portion so as to define a space therebetween. In this manner, the end portion of the pipe is adapted to receive therein an annular sealing gasket. The gasket is located against the end wall such that an end segment of the enlarged end portion extends beyond the gasket and such that at least a part of the gasket is located within the space defined by the protruding rib means. In addition to the first means and second means just described, the belling assembly of the present invention includes third means for inwardly deforming the outwardly extending end segment of the enlarged end portion, whereby to lock the gasket in place.

In a preferred embodiment of the present invention, the assembly includes fourth means for forming from the overall heated end section a second diametrically enlarged axial portion and a second transverse end wall, prior to thickening the enlarged end portion. This second enlarged portion is located between the first end wall and the second end wall and the latter joins the second enlarged portion with the rest of the pipe, the second enlarged portion being smaller in diameter than the first portion. Also in accordance with this embodiment, the assembly includes fifth means for substantially uniformly thickening the cross-sectional configuration of this second enlarged portion by decreasing its length.

BRIEF DESCRIPTION OF THE DRAWINGS

FIG. 1 is a frontal cross-sectional view of the bell end of a bell and spigot joint formed in accordance with the present invention.

FIG. 2 is a partial frontal and partial frontal cross-sectional view of an assembly which is constructed in accordance with the present invention and which is used in forming the bell end illustrated in FIG. 1.

FIGS. 3–6 are partial frontal cross-sectional views of the assembly illustrated in FIG. 2, these latter figures illustrating the assembly in different operating positions.

DETAILED DESCRIPTION AND PREFERRED EMBODIMENTS

Turning now to the Drawings, wherein like components are designated by like reference numerals throughout the various figures, attention is first directed to FIG. 1 which illustrates the bell end 10 of a bell and spigot joint, formed in accordance with the present invention. Bell end 10 is formed from one end section of a pipe constructed of a heat deformable material such as, for example, polyvinyl chloride (PVC), and includes an enlarged bell-shaped sleeve 12 which tapers inwardly at 14 and merges with the undeformed section 16 of the pipe. The inner diameter of sleeve 12 is preferably slightly greater than the outer diameter of undeformed section 16. Hence, the sleeve is adapted to receive the male counterpart member, i.e., spigot 18, of the bell and spigot joint in a coaxial fashion, the spigot having an outside diameter equal to that of the undeformed pipe section. In this regard, while the heat deformable pipe and therefore the enlarged sleeve will be described and illustrated as having a circular cross-section, it is to be understood that other cross-sectional configurations are contemplated.

As illustrated in FIG. 1, the enlarged sleeve 12 may be separated into three sections, a forward cylindrical section 20, a rearward cylindrical section 22 longitudinally spaced from and coaxial with the forward section and an intermediate section 24 integrally joining the forward and rearward sections. It should be apparent from FIG. 1 that intermediate section 24 defines an inner-circumferential groove 26 which is coaxial with sections 20 and 22 of the enlarged sleeve. An annular sealing gasket 28 which is constructed of, for example, medium hard rubber and which will be described in more detail below, is located within and substantially fills the groove 26 and extends inwardly a substantial distance beyond the inner surface of the sleeve. In this manner, the gasket provides a reliable seal between the spigot and bell end of the bell and spigot joint.

In providing groove 26, intermediate section 24 of enlarged sleeve 12 includes opposite longitudinally spaced sidewalls 30 and 32 which extend outwardly from adjacent ends of sections 20 and 22 respectively and which are integrally joined together by circumferential outer wall 34. As noted in FIG. 1, the inner-circumferential surfaces 36 and 38 of respective sidewalls 30 and 32 extend outwardly from the innermost periphery of groove 26 to the outermost periphery of the groove, i.e., to surface 40, and define the longitudinal extent of the groove.

In accordance with one aspect of the present invention, the configuration of the groove 26 and its associated sealing gasket 28 are such that the gasket is reliably locked in place within the groove. First note that the sidewall 32 includes a plurality of what may be referred to as protruding rib members 42 extending out from surface 38 towards surface 36. These protruding rib members are circumferentially spaced, preferably equally, around surface 38 and are located a slight distance inwardly from surface 40 so that a space is located between the latter and the protruding rib members. Also note that surface 36, while smooth, extends in substantially a radial direction, that is, a direction substantially normal to the pipe joint axis. Finally, note that sealing gasket 28 includes a backside 44 having a radial outermost circumferential segment 46 which fits within the space defined between protruding rib members 42 and surface 40 and the gasket also includes a front face 48 which engages surface 36 in a complementary fashion.

From the foregoing, it should be quite apparent that the sealing gasket 28 is locked in place within groove 26. The way in which this is accomplished, actually the way in which the entire bell end is formed with its gasket locked in place, will be described hereinafter with respect to FIGS. 2-6.

A second aspect of the present invention resides in its intended use in pressure service. As a result, the cross-sectional configuration of sections 20, 22 and 24 of enlarged sleeve 12 have been thickened. The particular way in which they were thickened and the particular assembly utilized in forming the bell end will be discussed below. In this regard, the exact thickness of the bell end is not critical to the present invention. Those of ordinary skill in the art can readily determine how thick sections 20, 22 and 24 should be relative to undeformed section 16, depending upon known factors such as the wall thickness of undeformed section 16, the pipe diameter and its specific intended use.

Turning now to FIG. 2, attention is directed to an assembly 50 which is constructed in accordance with the present invention and which is provided for forming bell end 10 in one end section of plastic pipe 16. In this regard, in order to form the bell end, the end section must be heated to its range of thermoelastic deformability. This can be accomplished in a conventional manner and hence will not be discussed herein.

As seen in FIG. 2, assembly 50 includes a mandrel 51 which is utilized in the formation of bell end 10. This mandrel includes a cylindrical core having a rearward section 52, the diameter of which is slightly less than the inner diameter of undeformed pipe section 16, and an enlarged forward section 54, the diameter of which is substantially equal or slightly greater than the outer diameter of spigot 18. The two sections which are coaxial and spaced apart are joined together by intermediate tapering section 56. As will be seen hereinafter, section 54 is provided for initially forming section 22 of bell end 10 and tapering section 56 is provided for initially forming tapered section 14 of the bell end. In this regard, in order to accurately contour the various sections of bell end 10, it is necessary to apply an exterior clamp to be described hereinafter. Moreover, in order to maintain the thermoelastic state of the plastic part during the period of formation, internal heating elements (not shown) may be used to control the temperature of the mandrel, thereby controlling the temperature of the plastic.

As illustrated in FIGS. 5 and 6, core section 54 includes a circumferential recess 58 within which is located a particular material 59 (to be described hereinafter) to allow the recess to be filled during initial thickening operations while at later stages it is adapted to receive sealing gasket 28 such that a portion of the gasket extends radially outwardly from the outermost surface of core section 54 and such that a portion extends radially inwardly therefrom. The primary reasons for this relationship between recess 58 and gasket 28 are discussed in detail in U.S. Pat. No. 3,907,481 which issued to R. W. Heisler on Sept. 13, 1975, reference being made thereto.

In addition to mandrel 51, assembly 50 includes an inner cylindrical sleeve 60 which fits concentrically around the outer surface of mandrel section 54, in a close fitting but slidable manner, as illustrated in FIG. 2. This cylindrical sleeve, which is provided for reasons to be discussed hereinafter, includes a plurality of rib forming openings 62 which extend back into the sleeve in the latter's front or forwardmost end 64. As will be seen, these openings are provided for forming previously described protruding rib members 42 and hence are spaced around the periphery of the end 64, preferably in a uniformly spaced fashion.

As seen in FIG. 2, sleeve 60 is only partially positioned around mandrel 51. For reasons to become apparent hereinafter, the sleeve is axially movable from the position illustrated to a position further along the surface of the mandrel, actually to the position illustrated in FIG. 4. Moreover, this sleeve is movable back from the position illustrated in FIG. 2, specifically to a position completely apart from the mandrel, as illustrated in FIG. 5. Any suitable means may be provided for moving sleeve 60 in the manner just described and those with ordinary skill in the art could readily provide such means. For example, the sleeve could be interconnected to one end of a piston 66 of an electrically, hydraulically or pneumatically driven piston and cylinder arrangement.

A second, outer sleeve 68 is concentrically located over sleeve 60 and includes a rearwardmost portion 70 which is adapted to move axially along and slidably engage the outer surface of sleeve 60. The outer sleeve also includes a forwardmost section 72 which is located a predetermined distance radially outwardly from the outer surface of sleeve 60, thereby defining an axially extending circumferential space 74. Outer sleeve 68 is movable from the position illustrated in FIG. 2 in a forward direction to the position illustrated in FIG. 3 and then more forwardly to the position illustrated in FIG. 4. Moreover, this outer sleeve is also movable away from mandrel 51, as illustrated in FIG. 5. Like sleeve 60, sleeve 68 includes any suitable means for moving it between the various positions described. For example, the free end of a piston 76 comprising part of an electrically, hydraulically or pneumatically driven piston and cylinder arrangement may be utilized.

In addition to the foregoing, assembly 50 includes a clamp arrangement 80 which is comprised of a fixed clamp portion or segment 82 and a movable segment or portion 84, both of which circumscribe mandrel 51. The two segments are connected together by means of one or more compression springs 86.

As illustrated in FIG. 2, fixed clamp segment 82 is somewhat U-shaped in cross-section and includes what may be referred to as an innermost rim 88, an outermost rim 90 and a cross-rim 92. For reasons to become apparent hereinafter, innermost rim 88 is uniformly spaced a fixed distance from the outer surfaces of mandrel sections 52 and 56. In this regard, the innermost rim includes an inwardly facing surface 94 which is transverse to the axis of mandrel 51, actually approximately parallel with tapering section 56 of mandrel 51.

Movable clamp segment 84 includes one portion, a rearward portion 96, which is adapted to movably fit between the innermost and outermost rims 88 and 90 of clamp segment 82. It is this portion of segment 96 which is connected to segment 82, specifically to cross-rim 92, by means of compression springs 86. In this way, the entire clamp segment 84 is movable from its biased position illustrated in FIG. 2 to a position closer to cross-rim 92 which is illustrated in FIGS. 4–6. Clamp segment 84 also includes a forwardmost portion 98 which is narrower in cross-section than portion 96 and which extends forwardly from the latter towards previously described sleeve 60. This forwardmost portion includes a forwardmost circumferential surface 100 which is in confronting relationship to but spaced from end 64 of sleeve 60 when the latter is in the position illustrated in FIG. 2. Moreover, surface 100 extends in a direction transverse to the axis of mandrel 51, approximately parallel to end 64 of sleeve 60 but actually turn more towards the vertical than end 64.

In addition to the foregoing, clamp arrangement 80 includes a stop pin 97 which is movable between an extended position, as illustrated in the various figures and a retracted position, not shown. Suitable means, for example, electric solenoid 99, is provided for moving the pin between the two positions. With the stop pin in its extended position, it is located in either a first opening 101 (see FIGS. 2 and 3) or a second opening 103 (See FIGS. 4–6), which openings are located on rearward portion 96 of clamp segment 84. The specific reason for this particular interlocking arrangement will be discussed hereinafter. However, for the moment, it will suffice to state that the stop pin keeps the movable clamp segment locked in place in its biased position (FIGS. 2 and 3) or its rearwardmost position (FIGS. 4–6).

Assembly 50 also includes four quarter clamps 102, one of which is illustrated in FIGS. 2–6. Each clamp is quarter circular in configuration so that in their closed position the four combine to form a full circle clamp having a continuous annular surface 104 which is transverse to the axis of mandrel 51. As illustrated in FIG. 2, the clamp is in an extended position away from inner and outer sleeves 60 and 68. In FIG. 5, one of the quarter clamps is shown in its radially inward position, that is, in a position which is in closer proximity to mandrel 51 and which together with the other clamps form a continuous annular surface 104. Of course, suitable means, for example a piston and cylinder arrangement 105, which can be readily provided by those with skill in the art are utilized to move the quarter clamps between their extended, radially outward positions and their radially inward clamping positions. Moreover, while four quarter clamps are used to form a full circle, two half clamps or other number of clamp segments could be provided.

Having described the various components making up assembly 50, attention is now directed to the manner in which this assembly is utilized to form bell end 10. In the first instance, it should be noted that the end section of plastic pipe 16 to be formed into a bell end is heated to its state of thermal deformability. With the various components of assembly 50 in the relative positions illustrated in FIG. 2, this heated end section is moved up and over mandrel sections 52, 54 and 56 and over inner sleeve 60, and the clamp assembly 80 is closed as illustrated in FIG. 2. In this manner, sleeve 60 and its transverse end 64 provide means for forming from the heated end section a end wall 108. Moreover, mandrel sections 54 and 56 provide means for forming from the heated end section a second diametrically enlarged axial portion 110 and a second transverse end wall 112. As illustrated in FIG. 2, the second enlarged portion is located between end walls 108 and 112 and the latter end wall interconnects enlarged portion 110 to the undeformed portion of the pipe, specifically portion 16.

Several points should be noted with regard to the relative positioning of the various components making up assembly 50 and the various deformed sections of pipe 60. First, it should be noted that enlarged portion 106 is located within recess 74, between inner sleeve 60 and segment 72 of outer sleeve 68. However it should be further noted with regard to this relative positioning that enlarged portion 106 is thinner than the cross-sectional configuration of recess 74. Also note that transverse wall 108 extends across the various openings 62 and is engaged on its backside, near its bottom, by the lower end of transverse surface 100. In a similar manner, note that enlarged segment 110 is located between section 54 of the mandrel and the underside of movable clamp portion 84 in what can also be called a recess. Like segment 106, segment 110 is thinner than the cross-section of this latter recess. Finally, note that the back or outer side of section 112, that is, the transverse section of the pipe (actually tapered section 14 in the final formation of bell end 10) is engaged by transverse surface 94 of fixed clamp portion 82. Finally, it should be noted that until gasket 28 is positioned in recess 58, the latter is filled with material 59. The reasons for this will be pointed out later. For the moment it suffices to say that the material 59 is selected and suitable means (not shown) are provided to expand the material to fill the recess (FIGS. 1-3) and to contract it to produce the recess (FIGS. 5 and 6).

With the foregoing in mind, attention is now directed to FIG. 3 which illustrates the next step in the formation of bell end 10. This step requires the movement of outer sleeve 68 from its position illustrated in FIG. 2 to its position illustrated in FIG. 3, that is, to a position closer to movable clamp portion 84. As the outer sleeve is moved in this way, the remaining components of assembly 50 remain fixed. Hence, as outer sleeve 68 moves to the right, sidewall 108 is held in place causing section 106 and a top portion of sidewall 108 to fill recess 74 which becomes shorter axially during this movement of the outer sleeve. Hence, the cross-sectional configuration of segment 106 is thickened while it is decreased in length. Notice that as this occurs, the various openings 62 in the end 64 of inner sleeve 60 are filled with excess plastic material which is forced into the area of sidewall 108, thereby forming previously described protruding rib members 42. Also note that recess 58 is filled with material 59 and hence the plastic cannot fill the recess.

One important point to note from the foregoing is that as segment 106 is thickened and protruding members 62 are formed, a force is exerted on movable clamp segment 96 in the direction of compression springs 86. It is important that these springs or other such means, for example stop pin 97 be chosen such that there is no significant movement of clamp segment 96 in response to this force. The stop pin accomplishes this by being positioned in opening 101.

As a second step after segment 106 is thickened and protruding members 42 are formed, outer sleeve 68 is moved further to the right along with inner sleeve 60, as illustrated in FIG. 4. In this second step, a sufficient amount of force is exerted on clamp segment 96 to move it to the right, causing springs 86 to compress or by suitable control means, stop pin 97 is momentarily moved to its retracted position to allow the clamp segment to move. Once this occurs, the stop pin is again moved to its extended position, into opening 103 to maintain the clamp segment in this position. The simultaneous movement of inner and outer sleeves 60 and 68 and clamp segment 96 causes thickened segments 106 and end wall 108 to move to the right and at the same time causes second enlarged section 110 of the pipe to fill its cavity as the cavity is reduced in length, thereby uniformly thickening the cross-sectional configuration of segment 110 by decreasing its length. Note that this can be carried out because section 112 is held in place by means of surface 94 of fixed clamp 82.

Having thickened sections 106 and 110 and having formed protruding members 42, inner sleeve 60 and outer sleeve 68 are moved to the left away from the rest of the assembly area. However, at the same time, stop pin 97 remains in opening 103 as illustrated in FIG. 5 to hold movable clamp segment 84 in place against compressed springs 86. With the various components making up assembly 50 positioned in this manner, annular sealing gasket 28 is positioned over mandrel section 54 such that the radially inwardly directing portion of the gasket sits within recess 58 of the mandrel and such that its upper rearward portion 32 fits within the space above protruding rib members 42. In this regard, material 59 is contracted, thereby providing recess 58. With the gasket in this position, a section of thickened pipe portion 106 extends beyond the front end of gasket 28, that is, to the left of the gasket as viewed in the various figures. At this time, quarter clamps 102 are moved together, as illustrated in FIG. 5. As this occurs, the inwardly directed surface 104 of the quarter clamps engage the extension of thickened section 106 causing it to deform inwardly, as illustrated in FIG. 5. Once this is accomplished, the previously described inner sleeve 60 moves to the right, that is, towards the mandrel to engage this deformed section and cause it to conform tightly to the front side of gasket 28, thereby locking the latter in place.

Having gone through the various steps just described, it can be seen that bell end 10 has been formed around mandrel 51. The bell end is now allowed to cool to the resulting shape; then all clamps are withdrawn and by relative movement of the bell end and the various components making up assembly 50, the bell end is removed from the mandrel.

In the discussion of assembly 50 it should have been apparent that the movement of the various components required precise timing. While the controls, for examples electrical and electro-mechanical controls, to accomplish this have not been shown or discussed, it is to be understood that they could readily be provided by those with ordinary skill in the art in accordance with the teachings of this disclosure.

What is claimed is:

1. A method of forming the bell end of a plastic pipe, said method comprising:
   (a) heating one end section of said pipe to the state of thermal deformability;
   (b) forming from said heated end section a diametrically enlarged axial portion and a transverse end wall joining said enlarged portion with the rest of said pipe;
   (c) after forming said enlarged portion, substantially uniformly thickening its cross-sectional configuration by decreasing its length;
   (d) while thickening the cross-sectional configuration of said enlarged portion, integrally forming outwardly protruding rib means on the inner surface of said transverse end wall, said rib means being located radially inwardly from the inner surface of said enlarged portion so as to define a space therebetween;
   (e) concentrically positioning a circumferential sealing gasket within said enlarged portion and against said end wall such that an end segment of said enlarged portion extends beyond said gasket, said gasket being shaped such that portions thereof are located within said space; and
   (f) radially inwardly deforming said end segment whereby to lock said sealing gasket in place.

2. A method according to claim 1 including:
   (g) forming from said heated end section a second diametrically enlarged axial portion and a second transverse end wall, prior to thickening said first-mentioned enlarged portion, said second enlarged portion being located between said first-mentioned end wall and said second end wall and the latter joining said second enlarged portion with the rest of said pipe, said second enlarged portion being smaller in diameter than said first enlarged portion.

3. A method according to claim 2 including:
(h) substantially uniformly thickening the cross-sectional configuration of said second enlarged portion by decreasing its length, after formation of said second enlarged portion.

* * * * *